United States Patent Office 2,820,045
Patented Jan. 14, 1958

2,820,045

1-(α-HYDROXYALKYL) ANDROSTENES AND PROCESS

Barney J. Magerlein, Kalamazoo, and John A. Hogg, Kalamazoo Township, Kalamazoo County, Mich., assignors to The Upjohn Company, Kalamazoo, Mich., a corporation of Michigan No Drawing. Application August 21, 1956
Serial No. 605,443

14 Claims. (Cl. 260—397.45)

This invention relates to steroid chemistry and is more particularly concerned with novel processes for the production of novel unsaturated 1-(α-hydroxyhydrocarbyl)-3-oxygenated-estrane-11β,17β-diols.

It is an object of this invention to provide the novel processes and novel compounds described herein, the compounds, particularly the 3-keto-4-estrene compounds, having anabolic, androgenic, anti-estrogen, and tranquilizing properties. Other objects and uses of this invention will be apparent to one skilled in the art.

The process of this invention, illustrated by the following equation wherein $R^1O$ is an ether radical,

is a hydrocarbonoyloxy radical,

is an α-hydroxyhydrocarbyl radical, $R^3$ is selected from the group consisting of keto [=O], and β-hydroxy and α-alkyl jointly

and $R^4$ is selected from the group consisting of hydrogen and alkyl, comprises: chemically reducing a compound selected from the group consisting of 3-etherified 3-hydroxy-11β-hydrocarbonoyloxy-1,3,5(10)-estratrien-17-one (Ia) and 3-etherified 11β-hydrocarbonoyloxy-17α-alkyl-1,3,5(10)-estratriene-3,17β-diol (Ib) with lithium, an alcohol, and liquid ammonia to produce, respectively, 3-etherified 1-(α-hydroxyhydrocarbyl)-2,5(10)-estradiene-3,11β,17β-triol (IIa) and 3-etherified 1-(α-hydroxyhydrocarbyl) - 17α - alkyl - 2,5(10) - estradiene - 3,11β,17β-triol (IIb), and hydrolyzing and isomerizing the thus-obtained dienes by heating with an acid hydrolyzing agent to produce, respectively, 1-(α-hydroxyhydrocarbyl)-11β,17β-dihydroxy-4-estren-3-one (IIIa)

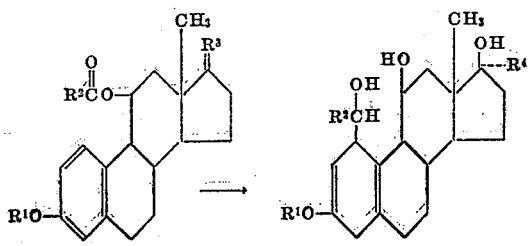

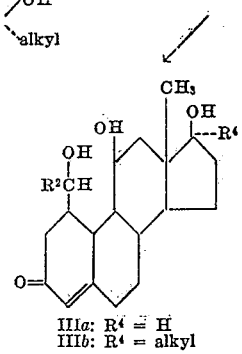

and 1 - (α-hydroxyhydrocarbyl)-11β,17β - dihydroxy-17α-alkyl-4-estren-3-one (IIIb). The starting 3-etherified 3-hydroxy - 11β-hydrocarbonoyloxy-1,3,5(10)-estratrien-17-one (Ia) is prepared by acylation of 3-etherified 3,11β-dihydroxy-1,3,5(10)-estratrien-17-one with the appropriate hydrocarbon acid, acid chloride, acid anhydride, etc. The starting 3-etherified 11β-hydrocarbonoyloxy-17α-alkyl-1,3,5(10)-estratriene-3,17β-diol (Ib) is prepared by alkylation of the 17-carbon atom of 3-etherified 3-hydroxy - 11β-hydrocarbonoyloxy - 1,3,5(10)- estratrien-17-one (Ia) by the Grignard method by heating with alkyl magnesium halide Grignard reagent (e. g. methyl bromide or iodide, ethyl chloride, bromide, or iodide, etc.), or an alkyl lithium compound, using a suitable solvent (e. g. ether, benzene, toluene, etc.), according to the same procedure described in copending application Serial No. 605,442, filed August 21, 1956, for the 17-alkylation of 3-etherified 3,11β - dihydroxy-1,3,5(10)-estratrien-17-one to produce 3-etherified 17α-alkyl-1,3,5(10)-estratriene-3,11β,17β-triol. 3-etherified 3,11β-dihydroxy-1,3,5(10)-estratrien-17-one is prepared according to the procedure described in copending application Serial No. 406,364, filed January 26, 1954.

In the processes of the present invention the exact nature of the ether radical ($R^1O$ in the foregoing equation) is immaterial, but generally said ether radical contains less than forty atoms. Preferably said radical is hydrocarbonoxy [hydrocarbon-O-] containing less than twelve carbon atoms. In an especially preferred embodiment of this invention said radical is alkoxy containing less than nine carbon atoms. The most preferred embodiment of said radical is methoxy. Illustrative ether radicals are methoxy, ethoxy, propoxy, butyroxy, valeroxy, hexoxy, heptoxy, octanoxy, dimethylmethoxy, diethylmethoxy, isobutyroxy, isovaleroxy, α-tetrahydropyranyloxy, α and β-naphthyloxy, cyclohexyloxy, cyclopentyloxy, β,β-dicarbethoxyethenyloxy, β-ketocyclohexenyloxy, α,β-dimethylethoxy, α,β- and β,β-diethylethoxy, benzoxy, ortho, meta and para-tolyloxy, α and β-phenylethyloxy, β-indolyloxy, α-furyloxy, α and β-cyclohexylethyleneoxy, ortho, meta and para-aminobenzoxy, etc. Further in the process of the present invention the hydrocarbonoyloxy radical

in the foregoing equation, generally contains less than twelve carbon atoms. Preferably the hydrocarbonoyloxy radical is a lower-alkanoyloxy radical containing less than nine carbon atoms. Especially preferred are alkanoyloxy radicals containing less than five carbon atoms, acetyloxy being the most preferred. Illustrative hydrocarbonoyloxy radicals are those of the acids formic, propionic, butyric, isobutyric, valeric, isovaleric, trimethylacetic, 2-methylbutyric, 3-ethylbutyric, hexanoic, diethylacetic, triethylacetic, heptanoic, octanoic, optically active abietic, α-ethylisovaleric, cyclopropylideneacetic, cyclopentylformic, cyclopentylacetic, α and β-cyclopentylpropionic, cyclohexylformic, cyclohexylacetic, α and β-cyclohexylpropionic, succinic, glutaric, α-methylglutaric, β-methylglutaric, β,β-dimethylglutaric, etc. It is obvious that in the α-hydroxyhydrocarbyl radical

in the foregoing equation, the radical portion R² without the carbinol group

is the same as the hydrocarbonoyloxy radical portion R² without the carbonyloxy group

and, therefore, R² is specified as the radical of the foregoing acids without the carboxyl group. Also in the processes of the present invention the 17α-alkyl radical generally contains less than nine carbon atoms and preferably contains less than five carbons. Especially preferred are alkyl radicals containing less than three carbon atoms with methyl being the most preferred alkyl radical. Illustrative alkyl radicals are methyl, ethyl, propyl, butyl, isobutyl, pentyl, hexyl, heptyl, octyl, isooctyl, etc.

In carrying out the process of the present invention 3-etherified 3 - hydroxy - 11β-hydrocarbonoyloxy-1,3,5(10)-estratrien-17-one (Ia) and 3-etherified 11β-hydrocarbonoyloxy - 17α - alkyl-1,3,5(10)-estratriene-3,17β-diol (Ib) are chemically reduced by the Birch reduction method with lithium (or sodium or potassium), an alcohol (preferably a lower-alkanol containing less than six carbon atoms, e. g. methanol, ethanol, isopropanol, etc.), and liquid ammonia, a solvent (e. g. ether, dioxane, tetrahydrofuran, etc.) being employed when necessary to obtain a homogeneous solution, to produce, respectively, 3 - etherified 1 - (α-hydroxyhydrocarbyl)-2,5(10)-estradiene-3,11β,17β-triol (IIa) and 3-etherified 1-(α-hydroxyhydrocarbyl) - 17α - alkyl-2,5(10)-estradiene-3,11β,17β-triol (IIb), preferred procedures being given in Examples 1 and 2. Hydrolyzing and isomerizing the thus-obtained dienes (IIa and IIb) to produce, respectively 1-(α-hydroxyhydrocarbyl) - 11β,17β - dihydroxy-4-estren-3-one (IIIa) and 1-(α-hydroxyhydrocarbyl)-11β,17β-dihydroxy-17α-alkyl-4-estren-3-one is accomplished (preferred procedures in Examples 3 and 4) by heating (suitably 65 to 125 degrees centigrade) suitably for fifteen minutes to four hours with an acid hydrolyzing agent, e. g. aqueous mineral acid (e. g. dilute sulfuric acid or the preferred dilute hydrochloric acid, etc.) or aqueous organic acid (e. g. fifty percent aqueous acetic acid, aqueous formic acid, etc.) of suitable acid strength using, if necessary, an organic solvent (e. g. methanol, ethanol, dioxane, etc.) to obtain a homogeneous reaction mixture, the shorter reaction periods and/or lower reaction temperatures usually being preferred when mineral acids are employed. The isolation and purification of the compounds of the foredescribed processes is accomplished by conventional procedures as illustrated by Examples 1 through 4.

The following examples are illustrative only and are not to be construed as limiting the scope of the present invention.

*Example 1.*—*1 - (α - hydroxyethyl)-3-methoxy-2,5(10)-estradiene-11β,17β-diol*

A solution of two-hundred milligrams of 3-methoxy-11β - acetoxy - 1,3,5(10)-estratrien-17-one (melting point 236 to 238 degrees centigrade; [α]$_D^{24}$ is plus 117 degrees in chloroform) in fifteen milliliters of purified dioxane, two milliliters of ethanol and fifty milliliters of ammonia is prepared and two-hundred milligrams of lithium is added. When the lithium has reacted, the solvent is evaporated. The resulting residue is treated with water and extracted with methylene dichloride. The methylene dichloride extract is dried over anhydrous sodium sulfate and the solvent evaporated to yield 1-(α-hydroxyethyl)-3-methoxy-2,5(10)-estradiene-11β,17β-diol.

In the same manner other 3-etherified 3-hydroxy-11β-hydrocarbonoyloxy-1,3,5(10)-estratrien-17-ones are chemically reduced to other 3-etherified 1-(α-hydroxyhydrocarbyl) - 2,5(10) - estradiene-3,11β,17β-triols, including those wherein the 3-ether, 11β-hydrocarbonoyloxy and 1-(α-hydroxyhydrocarbyl) radicals are those specified in the foregoing description.

*Example 2.*—*1-(α-hydroxyethyl)-3-methoxy-17α-methyl-2,5(10)-estradiene-11β,17β-diol*

3-methoxy-11β-acetoxy - 17α - methyl - 1,3,5(10)-estratrien-17β-ol in dioxane, ethanol, and liquid ammonia solution is reduced with lithium according to the procedure of Example 1 to produce 1-(α-hydroxyethyl)-3-methoxy-17α-methyl-2,5(10)-estradiene-11β,17β-diol.

Also following the procedure of Example 1 other 3-etherified 11β-hydrocarbonoyloxy-17α-alkyl-1,3,5(10)-estratriene-3,17β-diols are chemically reduced to other 3-etherified 1-(α-hydroxyhydrocarbyl)-17α-alkyl - 2,5(10)-estradiene-3,11β,17β-triols including those wherein the 3-ether, 11β-hydrocarbonoyloxy, 17α-alkyl, and 1-(α-hydroxyhydrocarbyl) radicals are those specified in the foregoing description.

*Example 3.*—*1-(α-hydroxyethyl)-11β,17β-dihydroxy-4-estren-3-one*

The 1-(α-hydroxyethyl)-3-methoxy-2,5(10)-estradiene-11β,17β-diol from Example 1 is dissolved in fifty milliliters of methanol containing five milliliters of 2.5 percent aqueous sulfuric acid solution and the resulting solution heated under reflux for one-half hour. The solvent then is distilled under vacuum and the residue remaining is extracted several times with methylene dichloride. The extract is chromatographed over fifteen grams of magnesium silicate (Florisil) using acetone-hexane (Skellysolve B) mixtures for elution. The main fraction eighty milligrams on recrystallization from ethyl acetate provides 1-(α-hydroxyethyl)-11β,17β-dihydroxy - 4 - estren - 3- one melting at 221 to 222 degrees centigrade.

*Analysis.*—Calculated for $C_{20}H_{30}O_4$: C, 71.82; H, 9.04. Found: C, 72.04; H, 8.90.

Following the foregoing procedure other 3-etherified 1 - (α - hydroxyhydrocarbyl) - 2,5(10) - estradiene-3,11β, 17β-triols are hydrolyzed and isomerized by heating with mineral acid in aqueous-organic solvent to produce other 1-(α - hydroxyhydrocarbyl)-11β,17β-dihydroxy-4-estren-3-ones, including those wherein the 3-ether and 1-(α-hydroxyhydrocarbyl) radicals are those specified in the foregoing description.

*Example 4.*—*1-(α-hydroxyethyl)-11β,17β-dihydroxy-17α-methyl-4-estren-3-one*

The 1 - (α - hydroxyethyl) - 3 - methoxy-17α-methyl-2,5 (10)-estradiene-11β,17β-diol from Example 2 is hydrolyzed and isomerized according to the procedure of Example 3 to produce 1-(α-hydroxyethyl)-11β,17β-dihydroxy-17α-methyl-4-estren-3-one.

Other 3-etherified 1-(α-hydroxyhydrocarbyl)-17α-alkyl-2,5(10)-estradiene-3,11β,17β-triols are hydrolyzed and isomerized in the same manner to produce other 1-(α-hydroxyhydrocarbyl)-11β,17β-dihydroxy-17α-alkyl-4-estren-3-ones, including those wherein the 3-ether, 1-(α-hydroxyhydrocarbyl), and 17α-alkyl radicals are those specified in the foregoing description.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:
1. An unsaturated 1-(α-hydroxyhydrocarbyl)-3-oxygenated-estrane-11β,17β-diol selected from the group consisting of compounds of the formulae

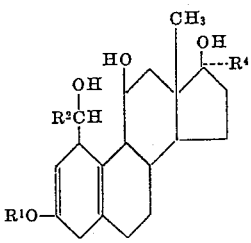

and

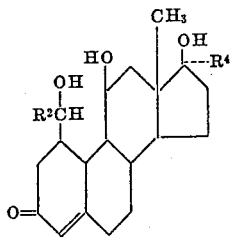

wherein R¹O is hydrocarbonoxy containing less than twelve carbon atoms,

is α-hydroxyalkyl containing less than nine carbon atoms, and R⁴ is selected from the group consisting of hydrogen and alkyl containing less than five carbon atoms.

2. 1 - (α - hydroxyalkyl) - 3 - alkoxy - 2,5(10) - estradiene-11β,17β-diol wherein the α-hydroxyalkyl radical contains less than five carbon atoms and the 3-alkoxy radical contains less than nine carbon atoms.

3. 1 - (α - hydroxyalkyl) - 3 - alkoxy - 17α - alkyl - 2,5-(10)-estradiene-11β,17β-diol wherein the α-hydroxyalkyl radical contains less than five carbon atoms, the 3-alkoxy radical contains less than nine carbon atoms and the 17α-alkyl radical contains less than three carbon atoms.

4. 1 - (α - hydroxyalkyl) - 11β,17β - dihydroxy - 4 - estren-3-one wherein the α-hydroxyalkyl radical contains less than five carbon atoms.

5. 1 - (α - hydroxyalkyl) - 11β,17β - dihydroxy - 17α - alkyl-4-estren-3-one wherein the α-hydroxyalkyl radical contains less than five carbon atoms and the 17α-alkyl radical contains less than three carbon atoms.

6. 1 - (α - hydroxyethyl) - 3 - methoxy - 2,5(10) - estradiene-11β,17β-diol.

7. 1 - (α - hydroxyethyl) - 3 - methoxy - 17α - methyl - 2,5(10)-estradiene-11β,17β-diol.

8. 1 - (α - hydroxyethyl) - 11β,17β - dihydroxy - 4 - estren-3-one.

9. 1 - (α - hydroxyethyl) - 11β,17β - dihydroxy - 17α - methyl-4-estren-3-one.

10. A process which comprises chemically reducing a compound selected from the group consisting of 3-etherified 3-hydroxy-11β-hydrocarbonoyloxy-1,3,5(10)-estratrien-17-one and 3-etherified 11β-hydrocarbonoyloxy-17α-alkyl-1,3,5(10)-estratriene-3,17β-diol with lithium, an alcohol, and liquid ammonia to produce, respectively, 3-etherified 1-(α-hydroxyhydrocarbyl)-2,5(10)-estradiene-3,-11β,17β-triol and 3-etherified 1-(α-hydroxyhydrocarbyl)-17α-alkyl-2,5(10)-estradiene-3,11β,17β-triol and hydrolyzing and isomerizing the thus-obtained dienes by heating with an acid hydrolyzing agent to produce, respectively, 1 - (α - hydroxyhydrocarbyl) - 11β,17β - dihydroxy - 4 - estren-3-one and 1-(α-hydroxyhydrocarbyl)-11β,17β-dihydroxy-17α-alkyl-4-estren-3-one, wherein the 3-ether radical contains less than forty atoms, the 11β-hydrocarbonoyloxy and α-hydroxyhydrocarbyl radicals contain less than twelve carbon atoms, and the 17α-alkyl radical contains less than nine carbon atoms.

11. A process which comprises chemically reducing a compound selected from the group consisting of 3-etherified 3 - hydroxy - 11β - hydrocarbonoyloxy - 1,3,5(10)-estratrien-17-one and 3-etherified 11β-hydrocarbonoyloxy-17α-alkyl-1,3,5(10)-estratriene-3,17β-diol with lithium, an alcohol, and liquid ammonia to produce, respectively, 3-etherified 1-(α-hydroxyhydrocarbyl)-2,5(10)-estradiene-3,11β,17β-triol and 3-etherified 1-(α-hydroxyhydrocarbyl)-17α-alkyl-2,5(10)-estradiene-3,11β,17β-triol and hydrolyzing and isomerizing the thus-obtained dienes by heating with an acid hydrolyzing agent to produce, respectively, 1 - (α - hydroxyhydrocarbyl) - 11β,17β - dihydroxy - 4 - estren-3-one and 1-(α-hydroxyhydrocarbyl)-11β,17β-dihydroxy-17α-alkyl-4-estren-3-one, wherein the 3-ether radical is hydrocarbonoxy containing less than twelve carbon atoms, the 11β-hydrocarbonoyloxy radical is alkanoyloxy containing less than nine carbon atoms, the α-hydroxyhydrocarbyl radical is α-hydroxyalkyl containing less than nine carbon atoms, and the 17α-alkyl radical contains less than five carbon atoms.

12. A process which comprises chemically reducing a compound selected from the group consisting of 3-etherified 3 - hydroxy - 11β - hydrocarbonoyloxy - 1,3,5(10)-estratrien-17-one and 3-etherified 11β-hydrocarbonoyloxy-17α-alkyl-1,3,5(10)-estratriene-3,17β-diol with lithium, an alcohol, and liquid ammonia to produce, respectively, 3-etherified 1-(α-hydroxyhydrocarbyl)-2,5(10)-estradiene-3,11β,17β-triol and 3-etherified 1-(α-hydroxyhydrocarbyl)-17α-alkyl-2,5(10)-estradiene-3,11β,17β-triol and hydrolyzing and isomerizing the thus-obtained dienes by heating with an acid hydrolyzing agent to produce, respectively, 1 - (α - hydroxyhydrocarbyl) - 11β,17β - dihydroxy - 4-estren-3-one and 1-(α-hydroxyhydrocarbyl)-11β,17β-dihydroxy-17α-alkyl-4-estren-3-one, wherein the 3-ether radical is alkoxy containing less than nine carbon atoms, the 11β-hydrocarbonoyloxy radical is alkanoyloxy containing less than five carbon atoms, the α-hydroxyhydrocarbyl radical is α-hydroxyalkyl containing less than five carbon atoms, and the 17α-alkyl radical contains less than three carbon atoms.

13. A process which comprises: reacting 3-methoxy-11β-acetoxy-1,3,5(10)-estratrien-17-one with lithium, a lower-alkanol, and liquid ammonia to produce 1-(α-hydroxyethyl) - 3 - methoxy - 2,5(10) - estradiene - 11β,17β-diol and heating the thus-obtained diene with dilute mineral acid to produce 1-(α-hydroxyethyl)-11β,17β-dihydroxy-4-estren-3-one.

14. A process which comprises: reacting 3-methoxy-11β-acetoxy-17α-methyl-1,3,5(10)-estratrien-17β-ol with lithium, a lower-alkanol, and liquid ammonia to produce 1 - (α-hydroxyethyl) - 3 - methoxy - 17α - methyl - 2,5(10)-estradiene-11β,17β-diol and heating the thus-obtained diene with dilute mineral acid to produce 1-(α-hydroxyethyl) - 11β,17β - dihydroxy - 17α - methyl - 4 - estren - 3-one.

References Cited in the file of this patent
UNITED STATES PATENTS 2,723,280  Inhoffen _____ Nov. 8, 1955
2,759,951  Djerassi _____ Aug. 21, 1956